United States Patent
Park et al.

(10) Patent No.: US 10,009,650 B2
(45) Date of Patent: Jun. 26, 2018

(54) METHOD AND APPARATUS FOR PROCESSING OBJECT-BASED AUDIO DATA USING HIGH-SPEED INTERFACE

(71) Applicant: LG ELECTRONICS INC., Seoul (KR)

(72) Inventors: Jangwoong Park, Seoul (KR); Hyeonjae Lee, Seoul (KR); Dokyun Kim, Seoul (KR); Jinkwon Lim, Seoul (KR); Hyunsik Yang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days. days.

(21) Appl. No.: 15/317,871

(22) PCT Filed: Jun. 12, 2015

(86) PCT No.: PCT/KR2015/005932
§ 371 (c)(1),
(2) Date: Dec. 9, 2016

(87) PCT Pub. No.: WO2015/190864
PCT Pub. Date: Dec. 17, 2015

(65) Prior Publication Data
US 2017/0134799 A1 May 11, 2017

Related U.S. Application Data

(60) Provisional application No. 62/011,048, filed on Jun. 12, 2014.

(51) Int. Cl.
*H04N 7/16* (2011.01)
*H04N 21/443* (2011.01)
(Continued)

(52) U.S. Cl.
CPC ........ *H04N 21/443* (2013.01); *H04N 21/439* (2013.01); *H04N 21/43635* (2013.01)

(58) Field of Classification Search
CPC .................. H04N 21/233; H04N 21/2335
See application file for complete search history.

(56) References Cited

U.S. PATENT DOCUMENTS 9,305,602 B2 * 4/2016 Jang ................ G11B 27/3027
9,756,445 B2 * 9/2017 Wang ..................... H04S 7/30
(Continued)

FOREIGN PATENT DOCUMENTS

KR  10-2010-0111609 A   10/2010
KR  10-2010-0138716 A   12/2010
(Continued)

*Primary Examiner* — Pankaj Kumar
*Assistant Examiner* — Timothy Newlin
(74) *Attorney, Agent, or Firm* — Birch, Stewart, Kolasch & Birch, LLP

(57) ABSTRACT

A method for processing data by a source device which transmits an object-based audio (OBA) using a high definition media interface (HDMI), includes when a sink device is connected, requesting the sink device to read an enhanced extended display identification data (E-EDID), receiving an E-EDID including OBA-processing information of the sink device from the sink device, the OBA processing information including at least one of capability information indicating capability of processing the OBA and property information required for processing the OBA, and determining whether the sink device is capable of processing the OBA based on the OBA processing information.

20 Claims, 22 Drawing Sheets

| Packet Type Value | Packet Type |
|---|---|
| 0x0B | 3D Audio Sample Packet (L-PCM format only) |
| 0x0C | One Bit 3D Audio Sample Packet |
| 0x0D | Audio Metadata Packet |
| 0x0E | Multi-Stream Audio Sample Packet |
| 0x0F | One Bit Multi-Stream Audio Sample Packet |
| 0x10 | Object Based Audio Sample Packet |

(51) Int. Cl.
*H04N 21/439* (2011.01)
*H04N 21/4363* (2011.01)

(56) References Cited

U.S. PATENT DOCUMENTS

| | | | |
|---|---|---|---|
| 9,762,887 B2 * | 9/2017 | Nakajima | H04N 13/0059 |
| 2006/0067690 A1 * | 3/2006 | Tatum | G02B 6/4246 |
| | | | 398/66 |
| 2009/0147961 A1 * | 6/2009 | Lee | H04H 40/36 |
| | | | 381/2 |
| 2009/0193490 A1 * | 7/2009 | Stone | G09G 5/003 |
| | | | 725/151 |
| 2010/0073574 A1 * | 3/2010 | Nakajima | G06F 3/14 |
| | | | 348/723 |
| 2010/0165198 A1 * | 7/2010 | Abe et al. | H04N 5/4403 |
| | | | 348/558 |
| 2010/0215044 A1 * | 8/2010 | Lee | G10L 19/167 |
| | | | 370/392 |
| 2011/0205224 A1 * | 8/2011 | Oh | H04N 5/445 |
| | | | 345/419 |
| 2011/0285818 A1 * | 11/2011 | Park | H04N 13/0048 |
| | | | 348/43 |
| 2011/0292173 A1 * | 12/2011 | Tsukagoshi | H04N 7/24 |
| | | | 348/43 |
| 2012/0101608 A1 * | 4/2012 | Jang | G11B 27/3027 |
| | | | 700/94 |
| 2012/0327250 A1 * | 12/2012 | Zhang | G09G 5/006 |
| | | | 348/180 |
| 2013/0050582 A1 * | 2/2013 | Tran | H04N 21/43635 |
| | | | 348/724 |
| 2014/0139738 A1 * | 5/2014 | Mehta | H04N 21/233 |
| | | | 348/515 |
| 2016/0127771 A1 * | 5/2016 | Pasqualino | H04N 21/43635 |
| | | | 348/474 |
| 2016/0323554 A1 * | 11/2016 | Oh | H04N 7/015 |
| 2016/0345055 A1 * | 11/2016 | Kim | H04N 21/43635 |
| 2017/0223336 A1 * | 8/2017 | Nakajima | H04N 13/0022 |

FOREIGN PATENT DOCUMENTS

| | | |
|---|---|---|
| KR | 10-2011-0095483 A | 8/2011 |
| WO | WO 2013/076639 A2 | 5/2013 |

* cited by examiner

[Figure 1]
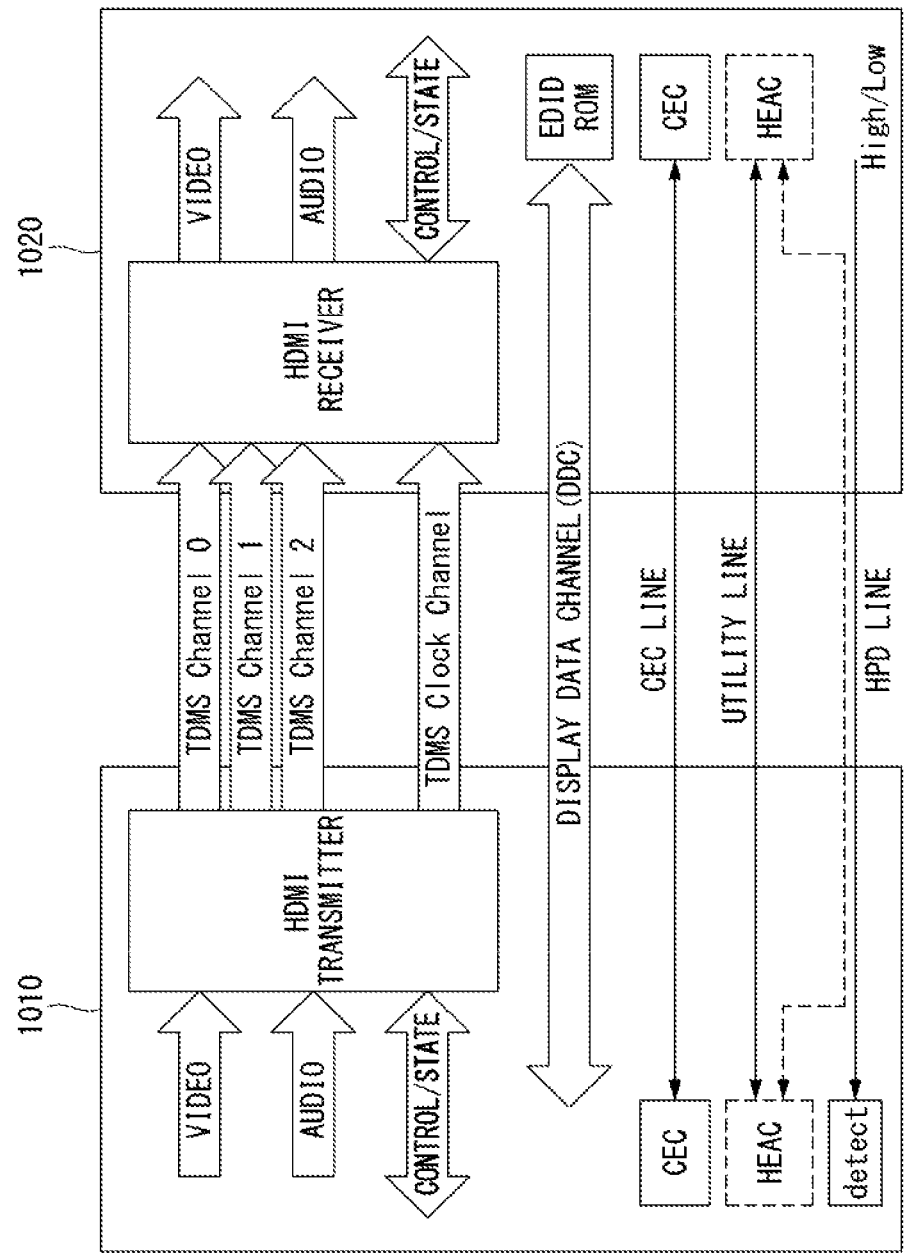

[Figure 2]
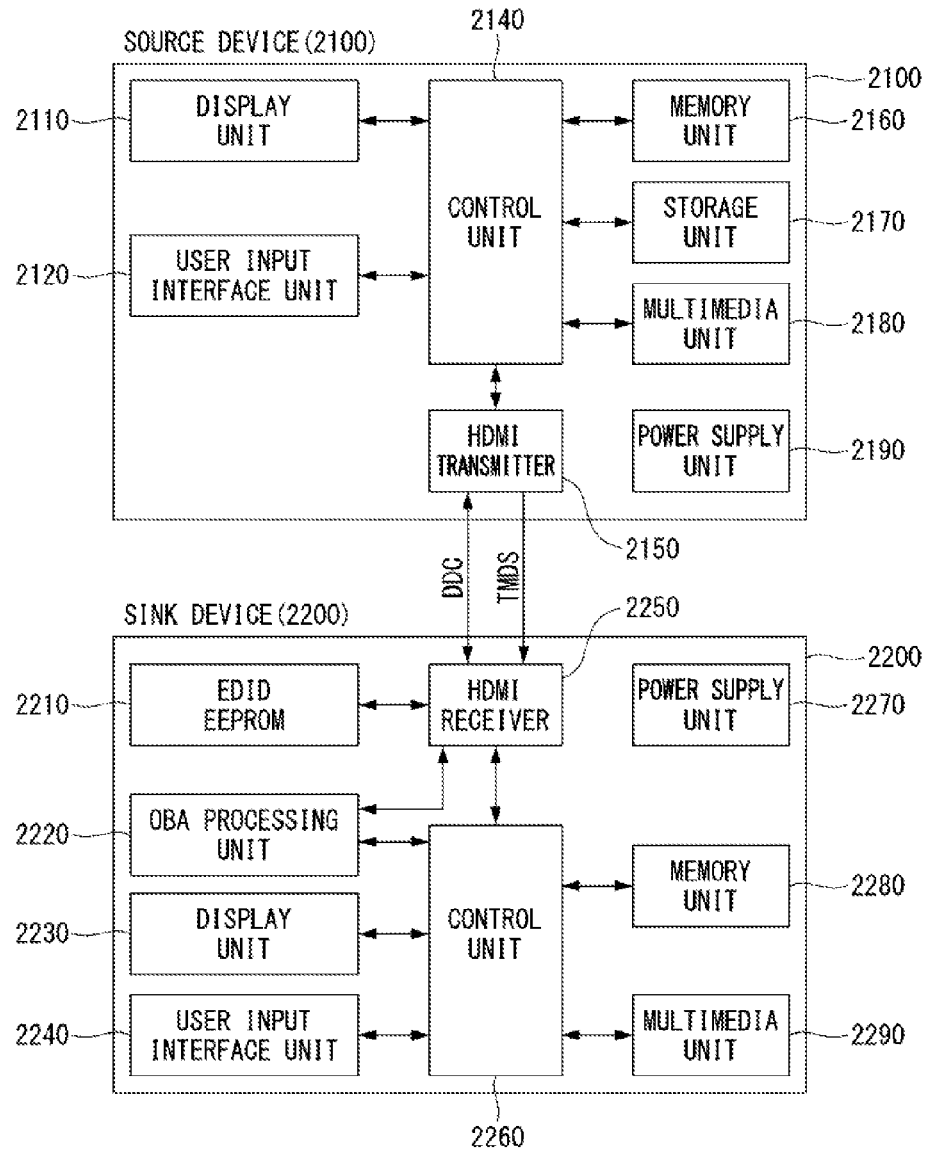

[Figure 3]

| Address | No. Bytes | Description |
|---|---|---|
| 00h ~ 07h | 8 | HEADER INFORMATION. FIXED TO 00 FF FF FF FF FF FF 00 |
| 08h ~ 11h | 10 | VENDOR/PRODUCT IDENTIFICATION. MANUFACTURER, PRODUCT CODE. SERIAL NO. AND MANUFACTURING DATE |
| 12h ~ 13h | 2 | EDID STRUCTURE VERSION/REVISION |
| 14h ~ 18h | 5 | BASIC DISPLAY PARAMETERS/FEATURES. DEFINE VIDEO INPUT (ANALOG OR DIGITAL), MAX. HORIZONTAL IMAGE SIZE, MAX. VERTICAL IMAGE SIZE, DISPLAY TRANSFER CHARACTERISTIC (GAMMA), FEATURE SUPPORT (WHETHER STANDBY, SUSPEND, DISPLAY TYPE, STANDARD DEFAULT COLOR SPACE (SRGB), PREFERRED TIMING MODE ARE SUPPORTED) |
| 19h ~ 22h | 10 | COLOR CHARACTERISTICS. INFORMATION RELATED TO COLOR AND WHITE POINT. DISPLAY AS XY COORDINATES OF RED, GREEN, BLUE, AND WHITE IN COLOR SPACE |
| 23h ~ 25h | 3 | ESTABLISHED TIMINGS. DESCRIBE COMMONLY WIDELY USED TIMING MODE |
| 26h ~ 35h | 16 | STANDARD TIMINGS. EIGHT STANDARD TIMING DESCRIPTORS ARE DESCRIBED, AND ONE DESCRIPTOR INCLUDES RANGE OF HORIZONTAL ACTIVE PIXEL, IMAGE ASPECT RATIO, REFRESH RATE (60~123HZ) INFORMATION. TIMING NOT INCLUDED IN ESTABLISHED TIMING IS DESCRIBED BASED ON VESA DMT STANDARD OR TIMING INFORMATION CALCULATED USING GFT. |
| 36h ~ 7Dh | 72 | DETAILED TIMING DESCRIPTORS. DETAILED TIMING INFORMATION REGARDING RESOLUTION SUPPORTED BY DISPLAY IS DESCRIBED, AND FOUR DESCRIPTORS ARE PRESENT. FIRST DESCRIPTOR DISPLAYS PREFERRED DETAILED TIMING. SECOND DESCRIPTOR DESCRIBES SECONDARY DETAILED TIMING OR MONITORED ADDITIONAL INFORMATION (SERIAL NUMBER, RANGE LIMITS, NAME) TWO THE OTHER DESCRIPTORS INCLUDE MONITORED ADDITIONAL INFORMATION. MONITORED RANGE LIMIT AND NAME SHOULD BE DESCRIBED |
| 7Eh | 1 | EXTEENSION FLAG. SPECIFY THE NUMBER OF ADDED EDID EXTENSION BLOCKS |
| 7Fh | 1 | CHECKSUM |

[Figure 4]

| Byte # | |
|---|---|
| 0 | Tag. 0x02 |
| 1 | Revision Number. 0x03 |
| 2 | BYTE NUMBER OFFSET D VALUE STARTED BY 18-BYTE DETAILED TIMING DESCRIPTOR (DTD) |
| 3 | INDICATION OF UNDERSCAN. SUPPORT AUDIO, SUPPORT YCBCR 4:4:4 OR YCBCR 4:2:2, NUMBER OF SUPPORTED NATIVE DTD |
| 4 | Start of data block collection |
| d-1 | End of data block collection |
| d | START OF 18-BYTE DTD. FOLLOW EDIT DTD FORMAT |
| d+(18*n)-1 | End of 18-byte DTD. n is the number of descriptors included |
| d+(18*n) | Beginning of Padding. 0x00 |
| 126 | End of Padding. 0x00 |
| 127 | Checksum. |

[Figure 5]

(a) Video Data Block

| Byte # | Bits 5-7 | Bits 0-4 |
|---|---|---|
| 0 | Video Tag Code | Short Video Descriptor TOTAL BYTES NUMBER (L1) |
| 1 | CEA Short Video Descriptor 1 | |
| L1 | CEA Short Video Descriptor L1 | |

(b) Audio Data Block

| Byte # | Bits 5-7 | Bits 0-4 |
|---|---|---|
| 0 | Audio Tag Code | Short Audio Descriptor TOTAL BYTES NUMBER (L2) |
| 1~3 | CEA Short Audio Descriptor 1 | |
| 4~3*L2 | CEA Short Video Descriptor L2/3 | |

(c) Speaker Allocation Data Block

| Byte # | Bits 5-7 | Bits 0-4 |
|---|---|---|
| 0 | Speaker allocation Tag Code | Speaker Allocation TOTAL BYTES NUMBER (L3=3) |
| 1~3 | Speaker Allocation Data Block Payload | |

[Figure 6]

| Byte / Bits # | 7 | 6 | 5 | 4 | 3 | 2 | 1 | 0 |
|---|---|---|---|---|---|---|---|---|
| 0 | Vendor Specific Tag Code (=3) | | | | Length(=N) | | | |
| 1 | IEEE OUI, Third Octet (0xD8) | | | | | | | |
| 2 | IEEE OUI, Second Octet (0x5D) | | | | | | | |
| 3 | IEEE OUI, First Octet (0xC4) | | | | | | | |
| 4 | Version (=1) | | | | | | | |
| 5 | Max_TMDS_Character_Rate | | | | | | | |
| 6 | SCDC_Present | RR_Capable | Rsvd(0) | Rsvd(0) | LTE_340Mcsc_scramble | Independent_view | Dual_View | 3D_OSD_Disparity |
| 7 | Rsvd(0) | Rsvd(0) | Rsvd(0) | Rsvd(0) | Rsvd(0) | DC_48bit_420 | DC_36bit_420 | DC_30bit_420 |
| ...N | Reserved (0) | | | | | | | |

[Figure 7]

(a) HF_VSIF Packet Header

| Byte/Bits # | 7 | 6 | 5 | 4 | 3 | 2 | 1 | 0 |
|---|---|---|---|---|---|---|---|---|
| 0 | Packet Type = 0x81 | | | | | | | |
| 1 | Version = 0x01 | | | | | | | |
| 2 | 0 | 0 | 0 | Length = Nv | | | | |

(b) HF_VSIF Packet Contents

| Packet Byte # | 7 | 6 | 5 | 4 | 3 | 2 | 1 | 0 |
|---|---|---|---|---|---|---|---|---|
| PB0 | Checksum | | | | | | | |
| PB1 | IEEE OUI_Third Octet (0xD8) | | | | | | | |
| PB2 | IEEE OUI_Second Octet (0x5D) | | | | | | | |
| PB3 | IEEE OUI_First Octet (0xC4) | | | | | | | |
| PB4 | Version (=1) | | | | | | | |
| PB5 | Rsvd(0) | Rsvd(0) | Rsvd(0) | Rsvd(0) | Rsvd(0) | Rsvd(0) | Rsvd(0) | 3D_Valid |
| (PB6)* | 3D_F_Structure | | | | 3D_Additional_Info_Present | 3D_Disparity_Data_Present | 3D_Meta_present | Rsvd(0) |
| (PB7)* | 3D_F_Ext_Data | | | | Rsvd(0) | | | |
| (PB8)* | Rsvd(0) | Rsvd(0) | Rsvd(0) | 3D_Dual_view | 3D_ViewDependency | | 3D_PreferredView | |
| (PB9)* | 3D_DisparityData_Version | | | | 3D_DisparityData_length(J) | | | |
| (PB9+1)* | 3D_DisparityData_1 | | | | | | | |
| ... | ... | | | | | | | |
| (PB9+J)* | 3D_DisparityData_J | | | | | | | |
| (PBm)* | 3D_MetaData_type | | | | 3D_MetaData_length(K) | | | |
| (PBm+1)* | 3D_Metadata_1 | | | | | | | |
| ... | ... | | | | | | | |
| PBm+K)* | 3D_Metadata_K | | | | | | | |
| ...PB (Nv) | Rsvd(0) | Rsvd(0) | Rsvd(0) | Rsvd(0) | Rsvd(0) | Rsvd(0) | Rsvd(0) | Rsvd(0) |

[Figure 8]

| Offset | R/W | Name |
|---|---|---|
| 0x01 | R | Sink Version |
| 0x02 | R/W | Source Version |
| 0x10 | R/W | Update_0 |
| 0x11 | R/W | Update_1 |
| 0x12-0x1F | R | Reserved for Update Related Uses |
| 0x20 | R/W | TMDS_Config |
| 0x21 | R | Scrambler_Status |
| 0x30 | R/W | Config_0 |
| 0x31-0x3F | R | Reserved for Configuration |
| 0x40 | R | Status_Flag_0 |
| 0x41 | R | Status_Flag_1 |
| 0x42-0x4F | R | Reserved for Status Related Uses |
| 0x50 | R | Err_Det_0_L |
| 0x51 | R | Err_Det_0_H |
| 0x52 | R | Err_Det_1_L |
| 0x53 | R | Err_Det_1_H |
| 0x54 | R | Err_Det_2_L |
| 0x55 | R | Err_Det_2_H |
| 0x56 | R | Err_Det_Checksum |
| 0xC0 | R/W | Test_Config_0 |
| 0xC1~0xCF | R | Reserved for test features |
| 0xD0 | R | Manufacturer IEEE OUI, Third Octet |
| 0xD1 | R | Manufacturer IEEE OUI, Second Octet |
| 0xD2 | R | Manufacturer IEEE OUI, First Octet |
| 0xD3-0xDD | R | Device ID |
| 0xDE-0xFF | R/W | Manufacturer Specific |
| All Remaining Offsets | R | Reserved |

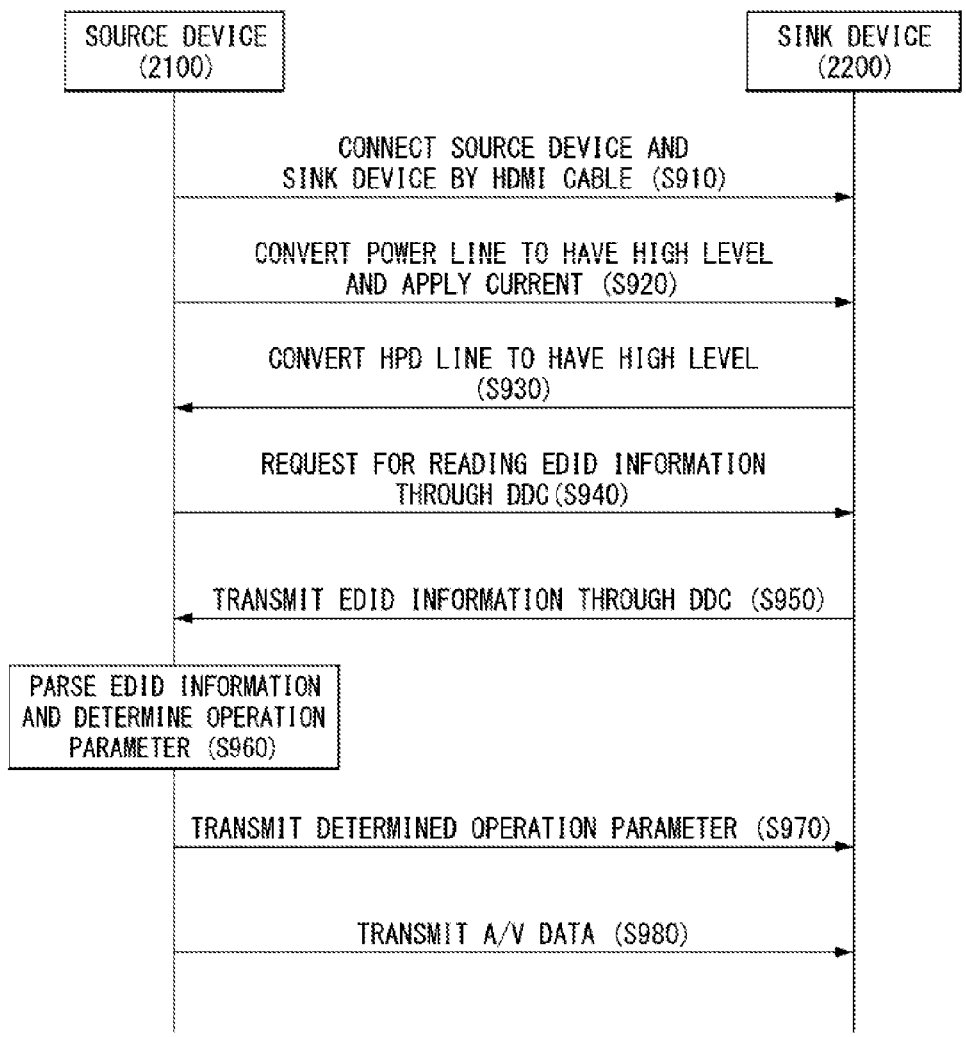
[Figure 9]

[Figure 10]
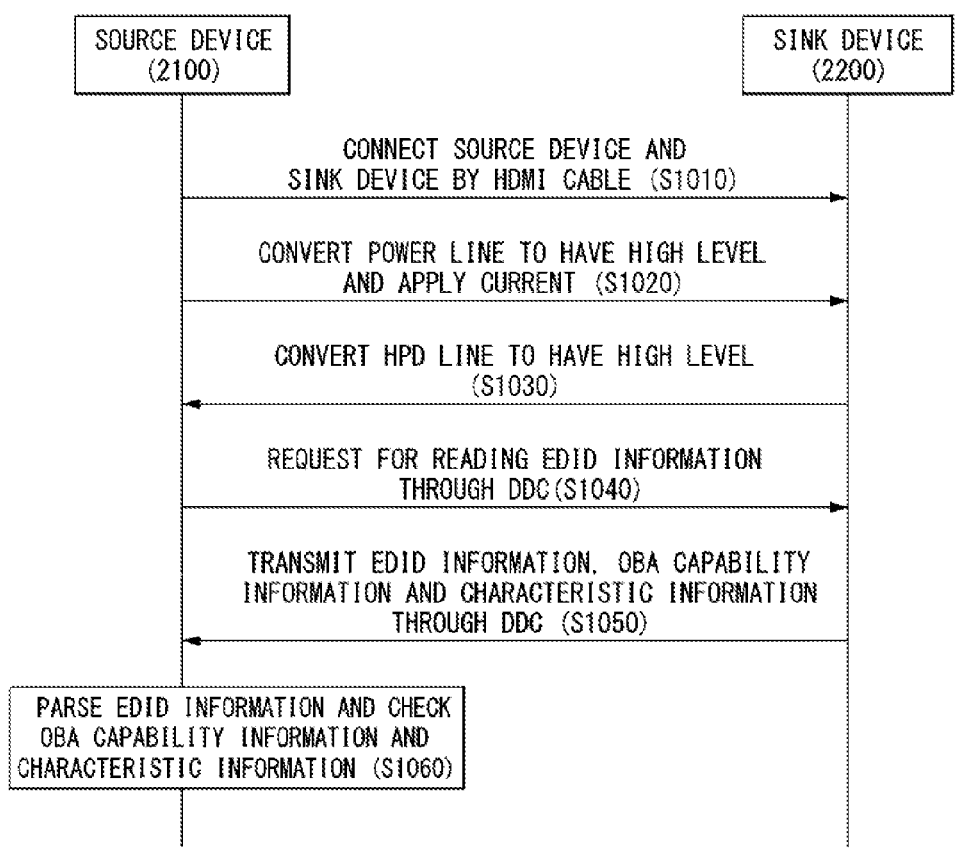

[Figure 11]
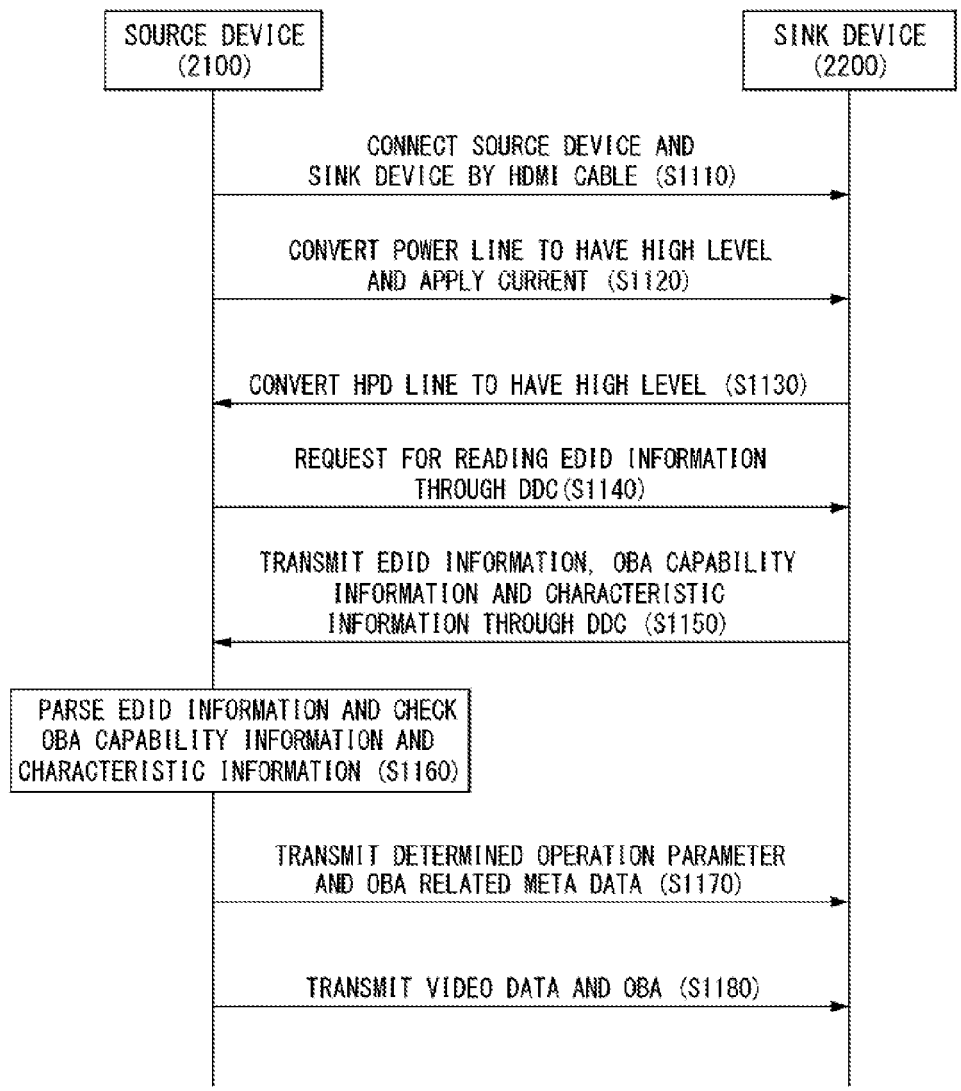

[Figure 12]
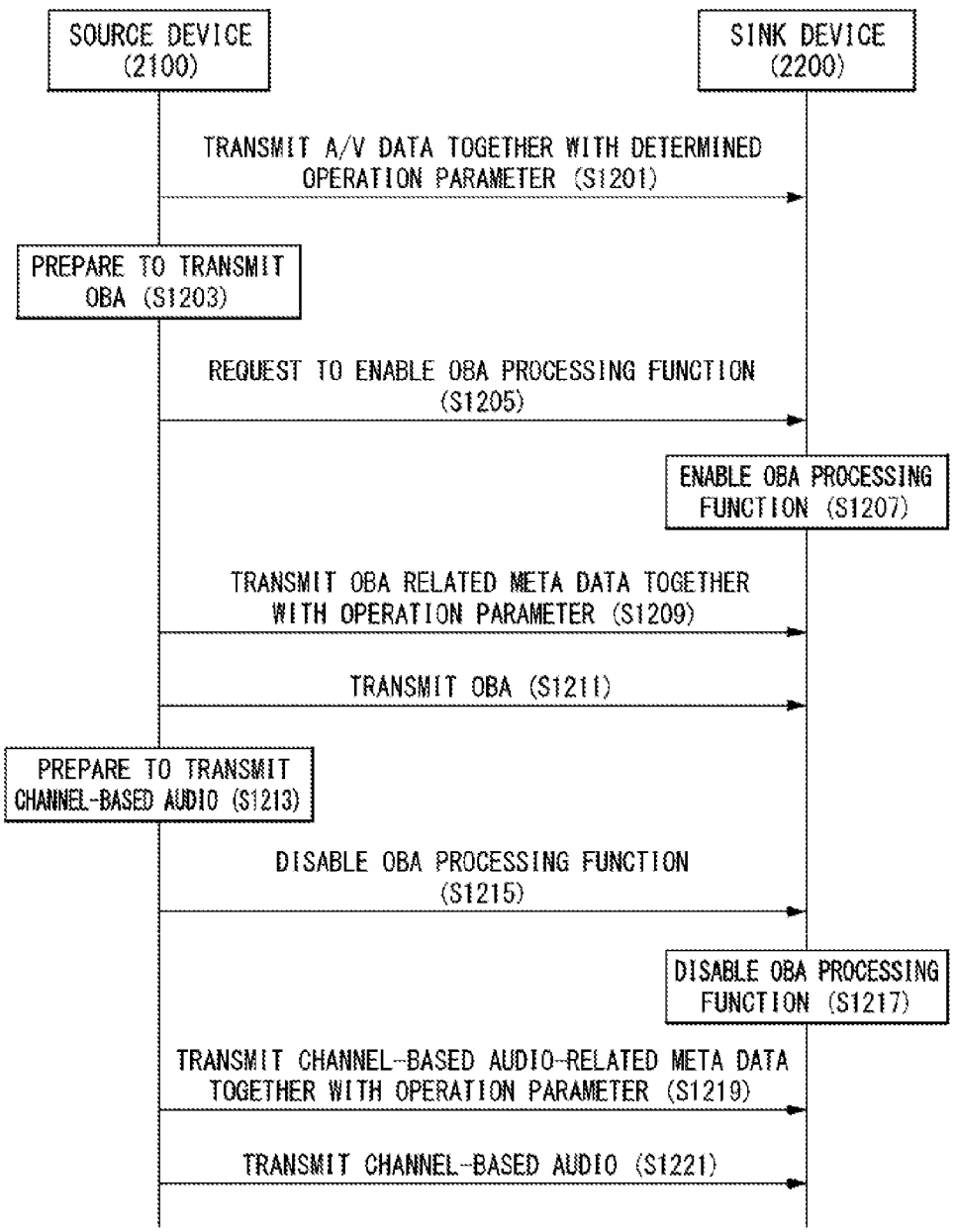

[Figure 13]
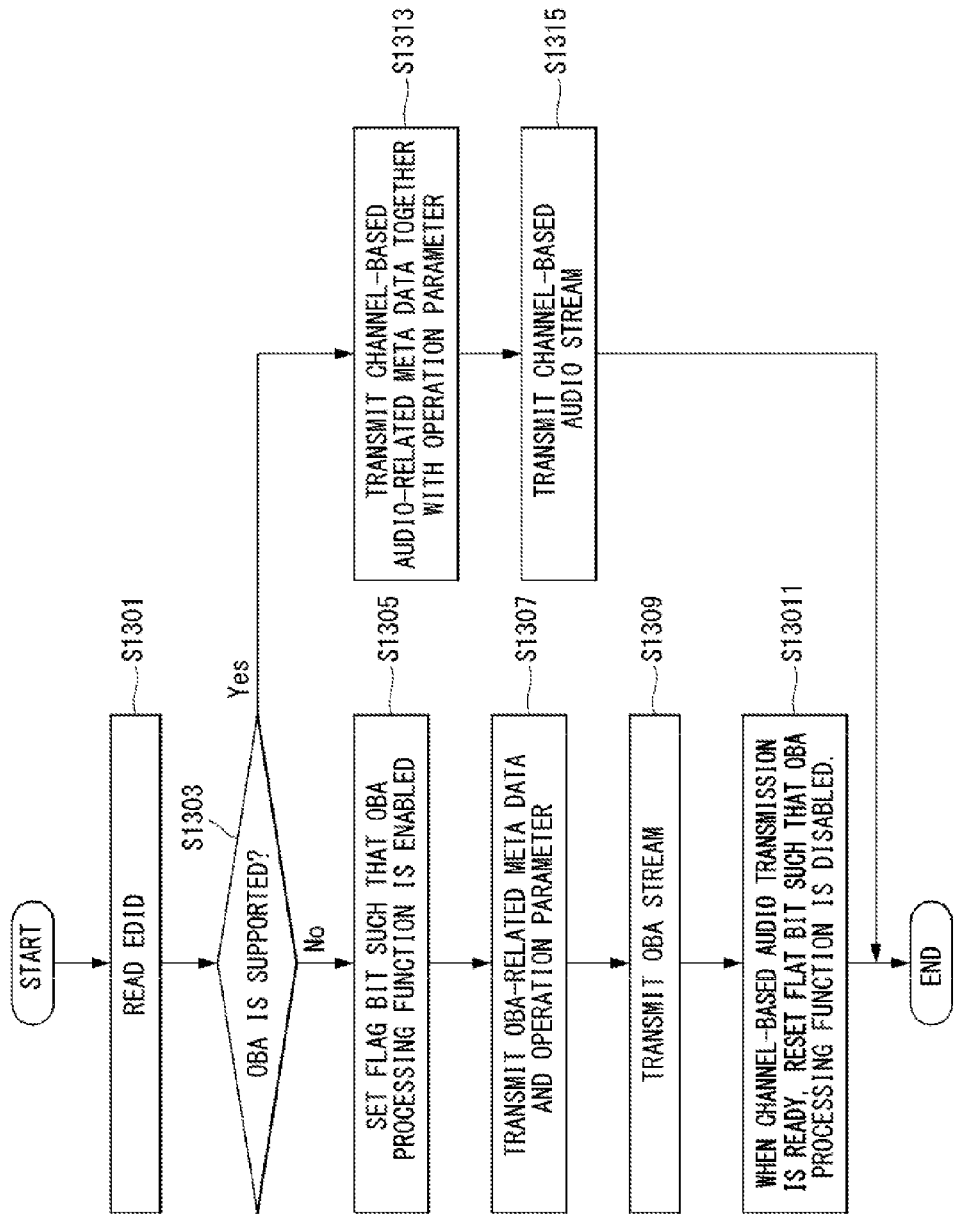

[Figure 14]

| Byte/Bits # | 7 | 6 | 5 | 4 | 3 | 2 | 1 | 0 |
|---|---|---|---|---|---|---|---|---|
| 1 | Tag Code = 7 | | | L = Length of following data block payload in bytes | | | | |
| 2 | Extended Tag Code = 18 (0x12) | | | | | | | |
| 3 | Rsvd(0) | | | | | | Supports_MS_NonMixed | Max_Stream_Count |
| 4 | Rsvd(0) | | | | | | | NUM_HDMI_3D_AD |
| (5)–(8) | (if NUM_HDMI_3D_AD > 0) | | | | | | | HDMI_3D_AD_1 |
| ... | | | | | | | | |
| (4*X+1) to (4*X+4) | (if NUM_HDMI_3D_AD > 0) | | | | | | | HDMI_3D_AD_X |
| (4*X+5) to (4*X+8) | (if NUM_HDMI_3D_AD > 0) | | | | | | | HDMI_3D_SAD |
| (4*X+9) to (4*X+12) | (if Object based audio Capable bit is present) | | | | | | | HDMI_OBA_AD |

[Figure 15]

| Byte/Bits # | 7 | 6 | 5 | 4 | 3 | 2 | 1 | 0 |
|---|---|---|---|---|---|---|---|---|
| 1 | F17=0 | Audio Format Code = 1111 | | | | Max. Number of channels - 1 | | |
| 2 | F27=0 | F26=0 | F25=0 | 96 kHz | 88.2 kHz | 48 kHz | 44.1 kHz | 32 kHz |
| 3 | Audio Coding Extension Type Code | | | | | Profile | Profile Level | |

[Figure 16]

| CXT | Audio Coding Extension Type |
|---|---|
| 0x00 | Refer to Audio coding Type |
| 0x01 | Not in use |
| 0x02 | Not in use |
| 0x03 | Not in use |
| 0x04 | MPEG-4 HE AAC |
| 0x05 | MPEG-4 HE AAC v2 |
| 0x06 | MPEG-4 AAC LC |
| 0x07 | DRA |
| 0x08 | MPEG-4 HE AAC + MPEG Surround |
| 0x09 | Reserved |
| 0x0A | MPEG-4 AAC LC + MPEG Surround |
| 0x0B-0x1F | Reserved |

[Figure 17]

| Profiles | Baseline profile | | | | LD profile | | |
|---|---|---|---|---|---|---|---|
| Levels | 1 | 2 | 3 | 4 | 1 | 2 | 3 |
| Hybrid QMF bank | × | × | × | × | – | – | – |
| LD-QMF bank | – | – | – | – | × | × | × |
| Max number of residual channels | 0 | 2 | 4 | 4 | – | – | – |
| Max sampling rate [kHz] | 48 | 48 | 48 | 96 | 48 | 48 | 48 |
| Max number of objects | 8 | 16 | 32 | 32 | 8 | 32 | 32 |
| Max number of downmix channels | 2 | 2 | 2 | 2 | 1 | 2 | 2 |
| Min number of required output channels | 2 | 2 | 2 | 2 | 2 | 2 | 5 |
| PCU HQ decoder | 12.2 | 20.4 | 33.9 | 67.8 | 8.4 | 20.7 | 39.3 |
| PCU LP decoder | 6.6 | 12.2 | 23.0 | 46.0 | N/A | N/A | N/A |
| PCU addition for transcoding | 1.1 | 1.1 | 1.1 | 2.3 | 0.7 | 1.1 | N/A |
| PCU reduction for integrated transcoding | -6.8 | -6.8 | -6.8 | -6.8 | -3.6 | -6.5 | N/A |
| RCU HQ decoder | 5.7 | 9.8 | 13.5 | 17.5 | 3.6 | 4.2 | 17.9 |
| RCU LP decoder | 4.8 | 5.4 | 5.7 | 10.3 | N/A | N/A | N/A |
| RCU reduction for integrated transcoding | -1.3 | -1.3 | -1.3 | -1.3 | -0.6 | -1.3 | N/A |

[Figure 18]

| Packet Type Value | Packet Type |
|---|---|
| 0x0B | 3D Audio Sample Packet (L-PCM format only) |
| 0x0C | One Bit 3D Audio Sample Packet |
| 0x0D | Audio Metadata Packet |
| 0x0E | Multi-Stream Audio Sample Packet |
| 0x0F | One Bit Multi-Stream Audio Sample Packet |
| 0x10 | Object Based Audio Sample Packet |

[Figure 19]

<PACKET HEADER>

| Byte/Bits # | 7 | 6 | 5 | 4 | 3 | 2 | 1 | 0 |
|---|---|---|---|---|---|---|---|---|
| HB0 | 0 | 0 | 0 | 1 | 0 | 0 | 0 | 0 |
| HB1 | Frame_start | Samples_invalid | Rsvd(0) | Rsvd(0) | Rsvd(0) | Rsvd(0) | Rsvd(0) | Rsvd(0) |
| HB2 | | | Rsvd(0) | Rsvd(0) | Rsvd(0) | Rsvd(0) | Rsvd(0) | Rsvd(0) |

[Figure 20]

<PACKET PAYLOAD>

| Byte/Bits # | 7 | 6 | 5 | 4 | 3 | 2 | 1 | 0 |
|---|---|---|---|---|---|---|---|---|
| PB0 | D.7 | D.6 | D.5 | D.4 | D.3 | D.2 | D.1 | D.0 |
| PB1 | D.15 | D.14 | D.13 | D.12 | D.11 | D.10 | D.9 | D.8 |
| ⋯ | ⋯ | ⋯ | ⋯ | ⋯ | ⋯ | ⋯ | ⋯ | ⋯ |
| PB26 | D.215 | D.214 | D.213 | D.212 | D.211 | D.210 | D.209 | D.208 |
| PB27 | D.223 | D.222 | D.221 | D.220 | D.219 | D.218 | D.217 | D.216 |

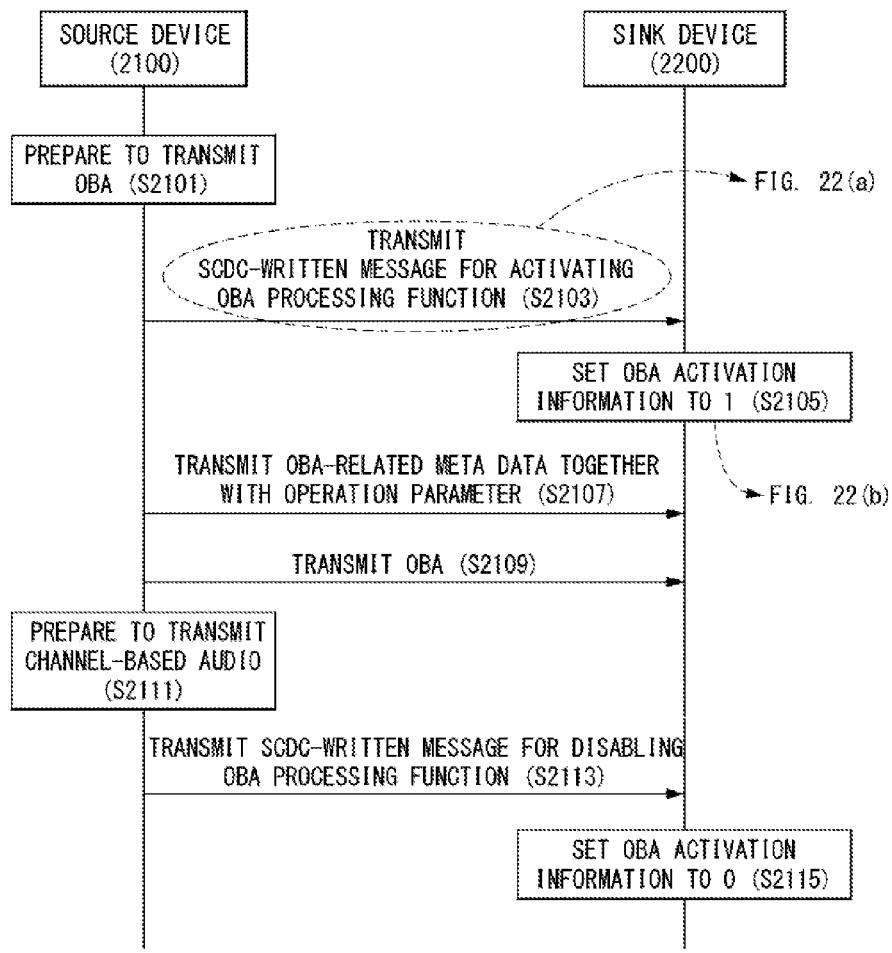
[Figure 21]

[Figure 22]

(A) SCDC-WRITTEN MESSAGE FOR ACTIVATING OBA PROCESSING FUNCTION

| S | Slv Addr = 0x54 (7 bits) | R/W = 0 (Write) | A | Sub-Address = 0x30 | A | Data = OBA_Enable | P |

(B) SET REGISTER OF OBA ACTIVATION INFORMATION

| Offset | Bit 7 | Bit 6 | Bit 5 | Bit 4 | Bit 3 | Bit 2 | Bit 1 | Bit 0 |
|---|---|---|---|---|---|---|---|---|
| 0x30 | Rsvd (0) | Rsvd (0) | Rsvd (0) | Rsvd (0) | Rsvd (0) | Rsvd (0) | Rsvd (0) | OBA_Enable |

METHOD AND APPARATUS FOR PROCESSING OBJECT-BASED AUDIO DATA USING HIGH-SPEED INTERFACE

CROSS REFERENCE TO RELATED APPLICATIONS

This application is the National Phase of PCT International Application No. PCT/KR2015/005932, filed on Jun. 12, 2015, which claims priority under 35 U.S.C. 119(e) to U.S. Provisional Application No. 62/011,048, filed on Jun. 12, 2014, all of which are hereby expressly incorporated by reference into the present application.

TECHNICAL FIELD

The present disclosure relates to an apparatus and method for transmitting and receiving data using high definition multimedia interface (HDMI) and, more particularly, to a method for transmitting and controlling object-based audio (data) in a high speed wired interface between a source device and a sink device.

BACKGROUND ART

A HDMI is an interface/standard for AV electronic products developed from a digital visual interface, an interface standard for personal computers and displays. The HDMI allows transmission of video/voice, without being compressed, from a player to a display device, rarely causing latency between a source device and a sink device and not requiring a separate decoder chip or software, to result in obtaining high format compatibility.

As UHD TVs have become prevalent, UHD content is provided through various storage mediums and services to provide vivid sense of realism and sense of immersion to viewers of UHD TVs. To enjoy UHD content, viewers may view non-compressed video by connecting a UHD TV and an external source device such as a set-top box (STB), a Blu-ray disk player, and the like, through a wired video interface such as HDMI, DisplayPort, and the like.

In addition, when transmission of an object-based audio, as well as a channel-based audio, is available, audio may be controlled by sound sources according to a user request, allowing the user to enjoy ample audio. However, a related art high speed interface lacks ability to transmit object-based audio.

DISCLOSURE

Technical Problem

The related art high speed wired interface transmits a channel-based audio. In a channel-based audio environment, it is possible to adjust strength of the entire audio signals, but it is impossible to control characteristics of an audio signal of each sound source, such as adjusting strength of an audio signal of each sound source included in an audio signal.

Thus, in the case of using an object-based audio signal, it is possible to control characteristics of an audio signal of each sound source, but a method for transmitting an object-based audio signal between devices connected by the related art high speed wired interface and property information thereof and controlling the same has not been defined so it is required to be defined.

Technical Solution

An aspect of the present disclosure is to determine whether a sink device and a source device support an object-based audio (OBA) processing function and define related information.

Another aspect of the present disclosure is to provide a method for transmitting OBA and related information between devices.

Also, in the present disclosure, when a source device and a sink device are connected, the sink device transmits an enhanced extended display identification data (E-EDID) including whether OBA processing function is supported and related property information to the source device through a display data channel (DDC). Here, in this disclosure, the E-EDID may also be referred to as EDID information or EDID, which may be appropriately replaced to be interpreted in a corresponding part. Upon receiving and interpreting the E-EDID, when the source device determines that the sink device supports the OBA processing function, the source device packetizes OBA based on the related property information and transmits the packetized audio to the sink device. Also, before transmitting the OBA, the source device may inform the sink device that audio to be transmitted from the source device is OBA through an audio infoframe.

Also, the present disclosure provides a method for transmitting OBA by a source device.

Also, the present disclosure provides a method for packetizing and transmitting OBA including a bit stream in order for the source device to transmit OBA in a data island section of a transition minimized differential signaling (TMDS) channel. Also, in the present disclosure, OBA is transmitted in units of 28 bytes, and a bit of OBA is allocated to a bit of a data packet of a data island section and transmitted. Also, in order to indicate that the transmitted audio is OBA, a new packet type is defined.

Also, the present disclosure provides a method for controlling an OBA processing function of a sink device by a source device.

Also, the present disclosure provides a method for enabling an object-based function of a sink device before a source device transmits OBA to the sink device supporting an OBA processing function. To this end, a status and control data channel structure (SCDCS) of the sink device may define a bit indicating enabling or disabling of the OBA processing function in the SCDCS of the sink device. Also, in order to control the defined bit, the OBA processing function may be enabled by setting a bit related to the OBA processing function defined in the SCDCS of the sink device to 1 through a status and control data channel (SCDC).

Also, in the present disclosure, in a case in which the source device, which has transmitted OBA, intends to transmit a channel-based audio, the source device may set a bit related to the OBA processing function defined in the SCDCS of the sink device to 0 through the SCDC before transmitting the channel-based audio, thereby disabling the OBA processing function.

Advantageous Effects

The present disclosure may provide users with an opportunity of enjoying ample audio by providing the method for transmitting OBA from the source device to the sink device, the method for transmitting whether OBA processing function is supported between devices and related information, the method for controlling an OBA processing function of the sink device by the source device, and operations thereof.

DESCRIPTION OF DRAWINGS

FIG. 1 is a view illustrating a high definition multimedia interface (HDMI) system and data transmission/reception channels included therein according to an embodiment to which the present disclosure is applied.

FIG. 2 is a schematic internal block diagram of a source device and a sink device in a HDMI system according to an embodiment to which the present disclosure is applied.

FIG. 3 is a view illustrating an E-EDID structure according to an embodiment to which the present disclosure is applied.

FIGS. 4 and 5 illustrate E-EDID extension blocks according to an embodiment to which the present disclosure is applied.

FIG. 6 is a view illustrating a HDMI forum (HF)-vendor-specific data block (VSDB) according to an embodiment to which the present disclosure is applied.

FIG. 7 is a view illustrating a HDMI forum (HF)-vendor specific infoframe (VSIF) according to an embodiment to which the present disclosure is applied.

FIG. 8 is a view illustrating a view illustrating a status and control data channel structure (SCDCS) according to an embodiment to which the present disclosure is applied.

FIG. 9 is a view illustrating a method for transmitting and receiving AN data through a HDMI according to an embodiment to which the present disclosure is applied.

FIG. 10 is a view illustrating a method for transmitting and receiving object-based audio processing information through a HDMI according to an embodiment to which the present disclosure is applied.

FIG. 11 is a view illustrating a method for transmitting and receiving object-based audio through a HDMI according to an embodiment to which the present disclosure is applied.

FIG. 12 is a view illustrating a method for enabling or disabling an object-based audio processing function of a sink device according to an embodiment to which the present disclosure is applied.

FIG. 13 is a view illustrating a method for transmitting an object-based audio or a channel-based audio according to whether an object-based audio processing function is supported according to an embodiment to which the present disclosure is applied.

FIG. 14 is a view illustrating a method for defining object-based audio processing information using a HDMI audio data block according to an embodiment to which the present disclosure is applied.

FIGS. 15 to 17 are views illustrating a method for defining object-based audio processing information using a CEA audio data block according to embodiments to which the present disclosure is applied.

FIGS. 18 to 20 are views illustrating a packet type, a packet header, and a packet payload for transmitting object-based audio according to embodiments to which the present disclosure is applied.

FIG. 21 is a view illustrating a method for enabling or disabling an object-based audio processing function using an SCDCS of a sink device according to an embodiment to which the present disclosure is applied.

FIG. 22 is a view illustrating an SCDC-write message enabling an object-based audio processing function and a set register of an object-based audio activation information according to an embodiment to which the present disclosure is applied.

BEST MODE

The present invention provides a method for processing data by a source device which transmits an object-based audio (OBA) using a high definition media interface (HDMI), including: when a sink device is connected, requesting the sink device to read an enhanced extended display identification data (E-EDID); receiving an E-EDID including OBA-processing information of the sink device from the sink device, the OBA processing information including at least one of capability information indicating capability of processing the OBA and property information required for processing the OBA; and determining whether the sink device is capable of processing the OBA based on the OBA processing information.

Also, in the present disclosure, the method may further include: when it is determined that the sink device is capable of processing the OBA, transmitting an operation parameter determined based on the E-EDID; and transmitting the OBA, wherein the operation parameter information includes OBA meta data.

Also, in the present disclosure, the method may further include: when it is determined that the sink device is incapable of processing the OBA, transmitting an operation parameter determined based on the E-EDID; and transmitting a channel-based audio, wherein the operation parameter information includes channel-based audio meta data.

Also, in the present disclosure, the method may further include: enabling or disabling the OBA processing function of the sink device, wherein enabling or disabling of the OBA processing function is performed using OBA activation information included in a status and control data channel structure (SCDCS) of the sink device.

Also, in the present disclosure, the OBA processing information may be defined in a HDMI audio data block or a CEA audio data block.

Also, the present disclosure provides a source device transmitting an object-based audio (OBA) using a high definition media interface (HDMI), including: a HDMI transmitter transmitting and receiving data through the HDMI; and a control unit controlling transmission of OBA through the HDMI, wherein the source device requests the sink device to read an enhanced extended display identification data (E-EDID) when a sink device is connected, receives E-EDID including OBA processing information of the sink device from the sink device, and determines whether the sink device is capable of processing the OBA based on the OBA processing information, wherein the OBA processing information includes at least one of capability information indicating capability of processing the OBA and property information required for processing the OBA.

Also, in the present disclosure, when it is determined that the sink device is capable of processing the OBA, the source device may transmit an operation parameter determined based on the E-EDID and transmit the OBA, wherein the operation parameter information includes OBA meta data.

Also, in the present disclosure, when it is determined that the sink device is incapable of processing the OBA, the source device may transmit an operation parameter determined based on the E-EDID and transmit a channel-based audio, wherein the operation parameter information may include channel-based audio meta data.

Also, in the present disclosure, the source device may enable or disable the OBA processing function of the sink device, wherein enabling or disabling of the OBA processing function is performed using OBA activation information included in a status and control data channel structure (SCDCS) of the sink device.

Also, the present disclosure provides a method for processing data by a sink device which receives an object-based audio (OBA) using a high definition media interface (HDMI), including: receiving a request for reading enhanced extended display identification data (E-EDID) from a connected source device; transmitting E-EDID including OBA processing information of the sink device to the source device, the OBA processing information including at least one of capability information indicating capability of processing the OBA and property information required for processing the OBA; and receiving operation parameter information from the source device.

Also, in the present disclosure, the method may further include: when the sink device is capable of processing the OBA, receiving an operation parameter determined based on the E-EDID from the source device; and receiving the OBA from the source device, wherein the operation parameter information includes OBA meta data.

Also, in the present disclosure, the method may further include; when the sink device is incapable of processing the OBA, receiving an operation parameter determined based on the E-EDID; and receiving a channel-based audio, wherein the operation parameter information includes channel-based audio meta data.

Also, in the present disclosure, the method may further include: enabling or disabling the OBA processing function of the sink device, wherein enabling or disabling of the OBA processing function is performed based on OBA activation information included in a status and control data channel structure (SCDCS) of the sink device.

Also, the present disclosure provides a sink device receiving an object-based audio (OBA) using a high definition media interface (HDMI), including: a HDMI receiver transmitting and receiving data through the HDMI; an OBA processing unit processing OBA received through the HDMI; and a control unit controlling the HDMI receiver and the OBA processing unit, wherein the sink device receives a request for reading enhanced extended display identification data (E-EDID) from a connected source device, transmits E-EDID including OBA processing information of the sink device to the source device, and receives operation parameter information from the source device, wherein the OBA processing information including at least one of capability information indicating capability of processing the OBA and property information required for processing the OBA.

Also, in the present disclosure, when the sink device is capable of processing the OBA, the sink device may receive an operation parameter determined based on the E-EDID from the source device, and receive the OBA from the source device, wherein the operation parameter information includes OBA meta data.

Also, in the present disclosure, when the sink device is incapable of processing the OBA, the sink device may receive an operation parameter determined based on the E-EDID and receive a channel-based audio, wherein the operation parameter information includes channel-based audio meta data.

Also, in the present disclosure, the OBA processing function of the sink device may be enabled or disabled, wherein enabling or disabling of the OBA processing function may be performed based on OBA activation information included in a status and control data channel structure (SCDCS) of the sink device.

MODE FOR INVENTION

Hereinafter, elements and actions of embodiments of the present invention will be described below in more detail with reference to the accompanying drawings. However, the elements and actions illustrated in the drawings and described with reference thereto are set forth only as examples and do not limit the spirit of the invention or its key elements and actions.

The terms used in this specification were selected to include current, widely-used, general terms. However, in certain cases, a term may be one that was arbitrarily established by the applicant. In such cases, the meaning of the term will be defined in the relevant portion of the detailed description. As such, the terms used in the specification are not to be defined simply by the name of the terms but are to be defined based on the meanings of the terms as well as the overall description of the present invention.

Also, terms used in this disclosure are general terms selected to described the invention but may be replaced with any other terms having a similar meaning for more appropriate interpretation. For example, a signal, data, information, and the like, may be appropriately replaced and interpreted in each signal procedure.

FIG. 1 is a view illustrating a high definition multimedia interface (HDMI) system and data transmission/reception channels included therein according to an embodiment to which the present disclosure is applied.

Devices transmitting and receiving video/audio/control data using high definition multimedia interface (HDMI) together may be termed a HDMI system, and the HDMI system may include a source device 1010, a sink device 1020, and a HDMI cable. In the HDMI system, a device transmitting video/audio data through the HDMI is a source device 1010 and a device receiving video/audio data through the HDMI is a sink device 1020, and a HDMI cable connecting the two devices and supporting data transmission and reception is provided. Here, audio data may include at least one of channel-based audio data and object-based audio data.

As illustrated in FIG. 1, HDMI cables and connectors may perform paring on four channels providing a transition minimized differential signaling (TMDS) data channel and a TMDS clock channel. The TMDS data channels may be used to transfer video data, audio data, and auxiliary data.

In addition, the HDMI system provides a video electronics standards association (VESA) display data channel (DDC). The DDC is used to exchange configuration and status information between a single source device and a single sink device. A CEC protocol may provide a high level control function among various audio/visual products of a user environment and may be optionally used. Also, an optional HDMI Ethernet and audio return channel (HEAC) may provide audio return channels (ARC) and Ethernet compatible data networking between connected devices in the opposite direction from the TMDS.

Video data, audio data, and additional data may be transmitted/received via three TMDS data channels. A TMDS clock generally runs a video pixel rate and is transmitted via a TMDS clock channel. The TMDS clock may be used as a frequency reference for data recovery in three TMDS data channels in a HDMI receiver. In a source device, 3-bit data per TMDS data channel is converted into 10-bit DC balanced transition-minimized sequence and serially transmitted at a 10-bit rate per TMDS clock period.

In order to transmit audio data and additional data via the TMDS channel, the HDMI uses a packet structure. In order to achieve high reliability for audio data and control data, data may be transmitted as a 10-bit word generated using a BCH error correction code and error reduction coding.

The source device may read enhanced extended display identification data (E-EDID) from a DDC sink device and discover configuration information and an available function of the sink device. In this disclosure, E-EDID may also be referred to as EDID information or EDID.

For example, the source device may read the EDID to determine whether the sink device supports an object-based audio (OBA) processing function and property information thereof. Here, the EDID may include OBA processing information, and the OBA processing information may include at least one of capability information indicating capability of processing OBA and property information required for processing the OBA.

A utility line may be used for an optional extension function such as an HEAC.

FIG. 2 illustrates a source device and a sink device in a HDMI system according to an embodiment of the present disclosure.

In the HDMI system, a device transmitting video/audio data through a HDMI is a source device 2100, and a device receiving video/audio data through the HDMI is a sink device 2200.

The source device 2100 includes at least one of a display unit 2110, a user input interface unit 2120, a control unit 2140, a HDMI transmitter 2150, a memory unit 2160, a storage unit 2170, a multimedia unit 2180, and a power supply unit 2190. The sink device 2200 includes at least one of an EDID EEPROM 2210, an OBA processing unit 2220, a display unit 2230, a user input interface unit 2240, a HDMI receiver 2250, a control unit 2260, a power supply unit 2270, a memory unit 2280, and a multimedia unit 2290. Hereinafter, a redundant description of a unit performing the same operation will be omitted.

The source device 2100 is a physical device transmitting or streaming content stored in the storage unit 2170 to the sink device 2200. The source device 2100 may transmit a request message to the sink device or receive a request message received from the sink device and process the same. Also, the source device 2100 may provide a UI of processing a response message transmitted from the sink device 2200 with respect to the transmitted request message and transferring the same to a user, and in a case in which the source device 2100 includes the display unit 2110, the UI may be provided as a display.

The sink device 2200 may receive content from the source device 2100, and transmit a request message to the source device 2100 or process a message received from the source device 2100 and transmit a response message. The sink device 2200 may also provide a UI of processing a response message received from the source device 2100 and transferring the same to the user, and in a case in which the sink device 2200 includes the display unit 2230, the UI may be provided to a display.

The source device 2100 and the sink device 2200 may include user input interface units 2120 and 2240 receiving a user's action or input, respectively, and in an embodiment, the user input interface units 2120 and 2240 may be a remote controller, a voice reception/recognition device, a touch input sensing/receiving device, and the like.

The memory units 2160 and 2280 are volatile physical devices temporarily storing various types of data.

The storage unit 2170 may be a non-volatile physical device for storing various types of data.

The EDID EEPROM 2210 is an EEPROM storing EDID information.

All the aforementioned memory unit, the storage unit, and the EDID EEPROM serve to store data, and may be generally referred to as a memory unit.

The display units 2110 and 2230 are units displaying data received through the HDMI or data stored in a content storage, a UI, and the like, on a screen under the control of a control unit.

The multimedia units 2180 and 2290 play various types of multimedia. The multimedia units 2180 and 2290 may be separately implemented from the control units 2140 and 2260 or may be implemented as a single component with a control unit.

The power supply units 2190 and 2270 supply electric power required for operations of the source device and the sink device and sub-units included therein.

The HDMI transmitter 2150 is a unit provided in the source device 2100 and transmitting and receiving data through the HDMI, which performs transmission and reception on data including a message such as a command, a request, an action, a response, and the like, as well as audio/video data.

The HDMI receiver 2250 is a unit provided in the sink device 2200 and transmitting and receiving data through the HDMI, which performs transmission and reception on data including a message such as a command, a request, an action, a response, and the like, as well as audio/video data.

A video encoding unit (not shown) may compress video data to be transmitted through the HDMI transmitter 2150, and a video decoding unit (not shown) may decompress compressed video data received through the HDMI receiver 2250.

Hereinafter, channels, data structures, and functions provided by the HDMI will be described in more detail.

As discussed above, the HDMI system provides a display data channel (DDC), a protocol standard for transmission of digital information between a monitor and a computer graphic adapter defined in the video electronics standard association (VESA). Through the DDC, HDMI devices transmit display mode information that can be supported by a monitor to a graphic adapter, and the graphic adapter may transmit an image to the monitor accordingly. Before the DDC standard was stipulated, the VGA standard used four pins (11, 12, 4, and 15) of an analog VGA connector to recognize a monitor type, and among them, only the pins 11, 12, and 4 were used to recognize seven types of monitor. Versions of DDC are as follows.

\*\* DDC version 1 (established in 1994)
  It defines an extended display identification data (EDID), a binary file format, describing monitoring information.
  It uses pin 12 as a data line and continuously transmits 128-byte EDID blocks from a monitor to a computer.

\*\* DDC version 2 (established in 1996)
  It does not define EDID in DDC but defines EDID as a parallel independent standard.
  It is defined based on I2C serial bus and pin 12 is used as a data line of I2C bus, and pin 15 is used as a clock line of I2C bus.
  Pin 9 is used for the purpose of applying 4V DC power (up to 50 mA) from a computer to a monitor to read EDID stored in an EEPROM even though a monitor power is OFF.

EDID storage capacity from 28 bytes to 256 bytes is permitted by 8-bit data offset.

** E-DDC

It is a standard replacing DDC version 1 and 2. Version 1 was established in 1999 and display information storage capacity was permitted up to 32 Kbytes to use E-EDID.

Applying a new 120 addressing scheme using a 8-bit segment index (0x00~0x7F), it is able to access 128 segments (1 segment=256 bytes), and thus, it is able to access up to 32 bytes.

E-DDC version 1.1 was established in 2004, which includes contents of supporting a video interface such as a HDMI, in addition to a CE device and VGA.

E-DDC version 1.2 was established in 2009, which includes contents of supporting a display port and a display ID.

Hereinafter, an EDID provided through the DDC will be described.

FIG. 3 is a view illustrating an EDID structure according to an embodiment to which the present disclosure is applied.

An EDID is a data structure including various types of information regarding a display device defined in VESA, which may be transmitted to the source device via a DDC channel or may be read by the source device. In the case of EDID, a data structure of version 1.3 is used in an IT display device, a CE display device, and a video interface (HDMI).

FIG. 3 briefly illustrates types of information represented by each address in an EDID data structure.

FIGS. 4 and 5 illustrate an EDID extension blocks according to embodiments to which the present disclosure is applied.

FIG. 4 illustrates an extension block, FIG. 5(a) illustrates a video data block, FIG. 5(b) illustrates an audio data block, and FIG. 5(c) illustrates a speaker allocation data block.

Timing information described in EDID is for IT display devices, and in order to indicate timing information of CE display devices, an EDID 1.3 extension block defined in VESA may be used. A CEA extension block of version 3 is defined in CEA-861b standard and four optional data blocks (video, audio, speaker allocation, vendor-specific) are stated.

In the video data block of FIG. 5(a), short video descriptor indicates a video identification code defined in CEA-861. In the audio data block of FIG. 5(b), short audio descriptor indicates an audio format code defined in CEA-861. Speaker allocation data block descriptor of FIG. 5(c) indicates a data block payload defined in CEA-861.

FIG. 6 is a view illustrating a HDMI forum (HF)-vendor-specific data block (VSDB).

The HF-VSDB of FIG. 6 is a data block for defining vendor-specific data, and the HDMI may define HDMI-specific data using this data block. The HF-VSDB may be included in an E-EDID of a sink device, and when included in the E-EDID, the HF-VSDB may be positioned in CEA extension version 3 of E-EDID.

Descriptions of the fields included in the HF-VSDB of FIG. 6 are as follows.

Length field: it is a total length of a data block, in which a minimum value is 7 and a maximum value is 31.

IEEE OUI field: It is an IEEE organizationally unique identifier, and an OUI allocated to ah HDMI forum is 0xC45DD8

Version field: It is a version number of HF-VSDB (HDMI Forum-VSDB), which is 1

Max_TMDS_CharacterRate field: It indicates a supported maximum TMDS character rate, and set to 0 when a sink device does not support 340 Mcsc or higher and set to 1 when the sink device supports 340 Mcsc or higher.

3D_OSD_Disparity: When it is set to 1, it indicates that a sink device supports reception of 3D_OSD_Disparity Indication.

Dual_view: When it is set to 1, it indicates that a sink device supports reception of Dual_view signaling.

Independent_view field: When it is set to 1, it indicates that a sink device supports reception of 3D independent view signaling LTE 340Mcsc scramble field: When it is set to 1, it indicates that a sink device supports scrambling at a TMDS character rate 340 Mcsc or lower. Also, when SCDC_Present is set to 0, this flag should also be set to 0.

RR_Capable field: When it is set to 1, it indicates that a sink device is allowed to initiate an SCDC read request. Also, when SCDC_Present is set to 0, this flag should also be set to 0.

SCDC_Present field: When it is set to 1, it indicates that a sink device supports a SCDC function.

DC_48 bit_420, DC_36 bit_420, DC_30 bit_420: When it is set to indicates that deep color 4:2:0 pixel encoding supports 10 bit/12 bit/16 bit per component.

In the present disclosure, decompression capability information of a sink device may be signaled through an HF-VSDB of EDID, and this will be described hereinafter.

FIG. 7 is a view illustrating a HDMI forum (HF)-vendor specific inforame (VSIF) according to an embodiment to which the present disclosure is applied.

In FIG. 7, FIG. 7(a) illustrates an HF-VSIF packet header and FIG. 7(b) illustrates an HF-VSIF packet content, and these may configure an inforame together. The HF-VSIF is one of inforames, and an HF-VSIF packet is provided to support feature(s) requesting ancillary information to fully identify stream content and may be transmitted from a source device to a sink device. In an embodiment, the HF-VSIF may be defined to transmit 3D video and 2160p video.

Descriptions of fields included in the HF-VSIF packet header of FIG. 7(a) and in the HF-VSIF packet content of FIG. 7(b) are as follows.

** HF-VSIF packet header

Packet Type field: It has a payload form and HF-VSIF is identified by 0x81.

Version field: It is a version number of HF-VSIF, having a value 1.

Length field: It indicates a length of payload

** HF-VSIF packet content

3D_Valid field: It indicates presence of 3D video data transmission. When it is set to 1, 3D_F_Structure, 3D_Addiotional_Info_Present, 3D_Meta_Present, and 3D_F_Ext_Data fields should be activated.

3D_F_Structure field: It indicates a transmission format (side-by-side, top-and-bottom, etc.) of 3D video data 3D_Additional_Info_Present field: It is set to 1 when 3D_DualView, 3D_ViewDependency, and 3D_Preferred2DView information are added.

3D_Disparity_Data_Present field: It is set to 1 when 3D disparity data is present.

3D_Meta_Present field: It is set to 1 when 3D meta data is present.

3D_F_Ext_Data field: It indicates a sub-sampling method according to a transmission format of 3D video data.

3D_Dual_View field: It is set to 1 when a 3D dual-view is present

3D_ViewDependency field: It indicates dependency regarding a coded view of a right view or a left view.

3D_Preferred2DView field: It indicates which of a right 3D view and a left 3D view is more appropriate for a 2D view 3D_DisparityData_Version field: It indicates a version of 3D disparity data.

3D_DisparityData_length field: It indicates a length of 3D disparity data

3D_DisparityData_1~3D_DisparityData_J field: It describes 3D disparity data

3D_MetaData_type field: It indicates a type of 3D meta data

3D_MetaData_length field: It indicates a length of 3D meta data

3D_Metadata_1~3D_Metadata_K_field: It describes 3D meta data.

FIG. 8 is a view illustrating a view illustrating a status and control data channel structure (SCDCS) according to an embodiment to which the present disclosure is applied.

A status and control data channel (SCDC) corresponds to a point-to-point communication protocol based on which a source device and a sink device exchanges data with each other. For SCDC communication, the aforementioned DDC channel (line I2C) may be used. That is, the SCDC is a one-to-one communication protocol based on I2C serial communication allowing for data exchange between the HDMI source device and the HDMI sink device. The SCDC includes a mechanism in which the sink device as an I2C slave requests status check read from the source device as an I2C master, and the source device reads a corresponding status from the sink device.

An SCDC structure (SCDCS) may be stored in the memory 15 of the sink device and include data having such a structure as in FIG. 8. In FIG. 8, R/W indicates whether the source device is able to only read or able to both read and write data of the SCDCS stored in the sink device, from the point of view of the source device.

Descriptions of fields included in the SCDCS are as follows.

Sink Version field: It indicates version information of an SCDCS-compliant sink device. It is set to 1.

Source Version field: When SCDCS-compliant source device reads an E-EDID from a sink device and SCDC_Present of the E-EDID is set to 1 (SCDC_Present=1), a source version of SCDCS is set to 1.

Update Flags (Update_0, Update_1) field: When information (status, character error detect, etc.) to be provided by a sink device to a source device is changed, a corresponding bit is set to 1.

TMDS Configuration (TMDS_Config) field: TMDS_Bit_Clock_Ratio and Scrambling_Enable each occupy 1 bit, and when a source device wants to enable a scrambling function of a sink device, a corresponding bit is set to 1. It is set to 0 when TMDS_Bit_Clock_Ratio is 1/10, and set to 1 when TMDS_Bit_Clock_Ratio is 1/40.

Scrambler Status field: When the sink device detects a scrambled control code sequence, a corresponding bit is set to 1.

Configuration (Config_0) field: It is a field for configuring information related to capability of source and sink devices, and presently, only an RR_Enable field indicating whether a source device supports a read request of a sink device is present.

Status Flags (Status_Flag_0, Status_Flag_1) field: It indicates whether data received through clock, channel 0, 1, and 2 has been successfully decoded.

Err_Det_0~2L/H field: It indicates an LSB and an MSB of an error counter detected from channels 0 to 3.

Err_Det_Checksum field: It is implemented such that the sum of 1 byte of error-detected values of seven registers including checksum is 0.

FIG. 9 is a view illustrating a method for transmitting and receiving A/V data through a HDMI according to an embodiment to which the present disclosure is applied.

In the embodiment illustrated in FIG. 9, a source device as one HDMI device transmits A/V data (at least one of audio data and video data) to a sink device as another HDMI device.

First, the source device 2100 and the sink device 2200 are connected by a HDMI cable (S910). When the HDMI cable is connected, the source device 2100 converts a power line of 5V from a low level to a high level and applies a current (S920). Accordingly, the source device 2100 may operate an EEPROM storing EDID information of the sink device 2200 and a related circuit. The sink device 2200 converts a hot plug detect (HPD) line from a low level to a high level (S930) to inform the source device that the cable has been normally connected and an EDID-related circuit has been activated to allow EDID information to be accessible.

Now, the source device 2100 may transmit a request for reading EDID information through a DDC (S940). In response to the request for reading the EDID from the source device 2100, the sink device 2200 may transmit the EDID information stored in the EEPROM to the source device 2100 through the DDC (S950). In the present embodiment of the present disclosure, the EDID information may be transmitted as the aforementioned VSDB.

The source device 2100 parses the received EDID information to determine an operation parameter of A/V data to be transmitted to the sink device 2200 (S960), and transmit the determined operation parameter related to the A/V data to be transmitted, to the sink device 2200 (S970). In an embodiment of the present disclosure, the operation parameter may be transmitted as an HF-VSIF.

Finally, the source device may transmit A/V data controlled by the determined operation parameter to the sink device 2200 (S980).

FIG. 9 is a view illustrating a method for transmitting A/V data. However, in a case in which OBA data is intended to be transmitted, the sink device should support an OBA processing function. Thus, the source device should know whether the sink device has capability of processing the OBA data, and transmit related information for processing the OBA data. Hereinafter, a method for transmitting and receiving OBA data will be described in more detail. Also, in this disclosure, OBA data will be described as an example, but contents of the present disclosure may also be applied to object-based video data in a similar manner.

FIG. 10 is a view illustrating a method for transmitting and receiving object-based audio processing information through a HDMI according to an embodiment to which the present disclosure is applied.

First, steps S1010 to S1040 are performed in the same manner as that of steps S910 to S940 of FIG. 9, and thus, descriptions thereof will be omitted and the descriptions of FIG. 9 may be applied to the example of FIG. 10.

In FIG. 10, upon receiving a request for reading EDID information, the sink device 2200 may transmit EDID information including OBA capability information and property information to the source device 2100 through the DDC (S1050). Here, the OBA capability information indicates whether the sink device 2200 is capable of processing OBA. For example, the OBA capability information may be defined as flag information. The property information represents information required for processing OBA, and may include at least one of audio coding type information (e.g., a spatial audio object coding (SAOC) type, or the like), profile information, and level information. The EDID information may be read from the EEPROM and transmitted as an HF-VSDB.

The source device 2100 parses the received EDID information and check at least one of the OBA capability information and property information (S1060). The source device 2100 may determine an operation parameter of OBA data to be transmitted to the sink device 2200 based on at least one of the OBA capability information and the property information. For example, the operation parameter may include meta data of OBA.

FIG. 11 is a view illustrating a method for transmitting and receiving object-based audio through a HDMI according to an embodiment to which the present disclosure is applied.

First, steps S1110 to S1160 are performed in the same manner as that of steps S1010 to S1060 of FIG. 10, and thus, descriptions thereof will be omitted and the descriptions of FIGS. 9 and 10 may be applied to the example of FIG. 11.

When the sink device 2200 supports the OBA processing function according to a result of checking at least one of the OBA capability information and property information in operation S1160, the source device 2100 may determine an operation parameter of OBA data to be transmitted to the sink device 2200. Here, the operation parameter of the OBA data may refer to information enabling controlling of the OBA data.

The source device 2100 may transmit the determined operation parameter and OBA related meta data to the sink device 2200 (S1170). Here, the OBA related meta data may be included in the operation parameter so as to be transmitted or may be transmitted as separated information. For example, the OBA related meta data may include at least one of an object name of OBA, the number of objects, an object type, and object description information.

Also, the source device 2100 may transmit video data and OBA data to the sink device 2200 (S1180).

FIG. 12 is a view illustrating a method for enabling or disabling an object-based audio processing function of a sink device according to an embodiment to which the present disclosure is applied.

The present disclosure provides a method for enabling or disabling an OBA processing function of the sink device 2200 in a case in which a type of audio data transmitted by the source device is intended to be changed from an object-based audio to a channel-based audio.

First, the source device 2100 may transmit AN data together with the determined operation parameter to the sink device 2200 (S1201).

Here, when the source device 2100 wants to transmit OBA to the sink device 2200, the source device 2100 may prepare to transmit OBA (S1203). For example, in a case in which content desired to be played by the user includes OBA, the source device 2100 may prepare to transmit OBA.

In order to transmit the OBA, the source device 2100 may request the sink device 2200 to enable an OBA processing function (S1205). The sink device 2200 may enable the OBA processing function in response to the request (S1207). Here, the sink device 2200 may inform the source device 2100 that the OBA processing function has been enabled.

When the sink device 2200 is capable of processing OBA as the OBA processing function is enabled, the source device 2100 may transmit an operation parameter together with OBA related meta data (S1209). Here, the OBA related meta data may be included in the operation parameter so as to be transmitted or may be transmitted as separate information. Also, the source device 2100 may transmit OBA (S1211).

With the OBA processing function of the sink device 2200 enabled, when the source device 2100 wants to transmit a channel-based audio, the source device 2100 may prepare to transmit the channel-based audio (S1213). For example, in a case in which content desired to be played by the user includes a channel-based audio, the source device 2100 may prepare to transmit the channel-based audio.

In order to transmit the channel-based audio, the source device 2100 may request the sink device 2200 to disable the OBA processing function (S1215). In response to the request, the sink device 2200 may disable the OBA processing function (S1217). Here, the sink device 2200 may inform the source device 2100 that the OBA processing function has been disabled.

When the sink device 2200 is not able to process OBA as the OBA processing function is disabled, the source device 2100 may transmit an operation parameter together with channel-based audio-related meta data (S1219). Also, the source device 2100 may transmit a channel-based audio (S1211).

As described above, enabling or disabling of the OBA processing function of the sing device by the source device may be requested using the SCDCS, and this will be described in more detail with reference to FIG. 22 hereinafter.

FIG. 13 is a view illustrating a method for transmitting an object-based audio or a channel-based audio according to whether an object-based audio processing function is supported according to an embodiment to which the present disclosure is applied.

A source device may read EDID transmitted from a sink device (S1301).

The source device may check whether the sink device supports an OBA processing function (S1303). Here, the source device may check whether the sink device supports an OBA processing function based on the EDID, and here, the EDID may include at least one of OBA processing capability information or property information of the sink device.

Upon checking, when the sink device supports the OBA processing function, the source device may set OBA activation flag information of the sink device (S1305). For example, the OBA activation flag information of the sink device may be expressed as "OBA_enable", and here, when "OBA_enable=1", it may indicate that the sink device supports the OBA processing function. Also, when "OBA_enable=0", it may indicate that the sink device does not support the OBA processing function.

Also, the source device may transmit OBA-related meta data and an operation parameter (S1307) and transmit an OBA stream (S1309).

When the source device wants to transmit a channel-based audio, the source device may request the sink device to disable the OBA processing function (S1311). Here, the OBA activation flag information "OBA_enable" of the sink device may be set 0.

Meanwhile, upon checking, when the sink device does not support the OBA processing function, the source device may transmit channel-based audio-related meta data and an operation parameter (S1313), and transmit an OBA stream (S1309).

FIG. 14 is a view illustrating a method for defining object-based audio processing information using a HDMI audio data block according to an embodiment to which the present disclosure is applied.

In the present disclosure, OBA processing information may be defined using a HDMI audio data block. Here, the OBA processing information may include at least one of capability information indicating capability of processing OBA and property information required for processing the OBA.

For example, referring to FIG. 14, capability information indicating capability of processing OBA may be defined by designating any one region among reserved regions of byte 3 or byte 4 of the HDMI audio data block.

Also, in the present disclosure, OBA-related property information may be defined in regions of byte (4*X+9) to byte (4*X+12) of the HDMI audio data block. For example, referring to FIG. 14, in a case in which bits available for processing OBA are present, "HDMI_OBA_AD" may be defined in the regions of byte (4*X+9) to byte (4*X+12) of the HDMI audio data block.

When HDMI 3D audio data is present in the HDMI audio data block, the OBA-related property information may be defined in a byte after the HDMI 3D audio data.

FIGS. 15 to 17 are views illustrating a method for defining object-based audio processing information using a CEA audio data block according to embodiments to which the present disclosure is applied.

In the present disclosure, OBA processing information may be defined using a CEA audio data block. FIG. 15 illustrates an example of a CEA audio data block, FIG. 16 illustrates an example of an audio coding extension type code, and FIG. 17 illustrates an example of profiles and levels.

For example, referring to FIG. 15, OBA processing information may be defined by defining an audio coding extension type code in the CEA audio data block.

In a specific example, referring to FIG. 16, an OBA coding type may be defined in a reserved region of an audio coding extension type code. For example, a spatial audio object coding (SAOC) type may be defined in a reserved region of 0x09 or 0x0B to 0x1F of the audio coding extension type code.

Thus, when an audio coding extension type code of the CEA audio data block indicates an OBA coding type, it may indicate that the sink device supports the OBA processing function.

In another embodiment, OBA property information may be defined using a CEA audio data block. For example, referring to FIG. 15, a profile and a level may be defined in a region of byte 3 in the CEA audio data block.

For example, when the profile is 0, it may indicate a baseline profile, and when the profile is 1, it may indicate a low delay (LD) profile. Also, the level indicates a profile level supportable in each profile. For example, referring to FIG. 17, the baseline profile may be defined by 1, 2, 3, and 4, and the LD profile may be defined by 1, 2, and 3.

FIGS. 18 to 20 are views illustrating a packet type, a packet header, and a packet payload for transmitting object-based audio according to embodiments to which the present disclosure is applied.

In the present disclosure, a packet type indicating an OBA sample packet for OBA transmission may be defined.

FIG. 18 illustrates a packet type transmitted and received in the HDMI to which the present disclosure is applied.

For example, when a packet type value is 0x0B, it indicates a 3D audio sample packet, when the packet type value is 0x0C, it indicates a 1-bit 3D audio sample packet, when the packet type value is 0x0D, it indicates an audio meta data packet, when the packet type value of 0x0E, it indicates a multistream audio sample packet, when the packet type value is 0x0F, it indicates a 1-bit multistream audio sample packet, and when the packet type value is 0x10, it indicates an OBA sample packet.

FIGS. 19 and 20 illustrate a packet header and a packet payload for OBA transmission, respectively. In FIGS. 19 and 20, packet bytes HB0 to HB2 indicate a packet header type, and PB0 to PB27 indicate packet content bytes.

In the packet header, byte HB0 indicates a packet type. Byte HB1 indicates a frame start, whether a sample is valid, and a reserved region, and byte HB2 indicates a reserved region.

In an embodiment of the present disclosure, when a source device and a sink device are connected, the sink device may include whether the sink device supports the OBA processing function and related property information in E-EDID and transmits the same to the source device through a DDC. Here, when it is determined that the sink device supports the OBA processing function, the source device may packetize OBA based on the related property information as illustrated in FIGS. 19 and 20, and transmit the same to the sink device. Before transmitting the OBA, the source device may inform the sink device that audio to be transmitted from the source device is OBA, through an audio infoframe.

Also, the present disclosure provides a method for packetizing OBA configured as a bit stream and transmitting the same in order to transmit the OBA in a data island interval of a transition minimized differential signaling (TMDS) channel from the source device to the sink device. Also, in the present disclosure, OBA may be transmitted in units of 28 bytes, and 1 bit of the OBA may be allocated to 1 bit of a data packet of the data island interval so as to be transmitted. Here, in order to indicate that the transmitted audio is the OBA, a new packet type as illustrated in FIG. 18 may be defined.

FIG. 21 is a view illustrating a method for enabling or disabling an object-based audio processing function using an SCDCS of a sink device according to an embodiment to which the present disclosure is applied. FIG. 22 is a view illustrating an SCDC-write message enabling an object-based audio processing function and a set register of object-based audio activation information according to an embodiment to which the present disclosure is applied.

The present disclosure provides a method for controlling an OBA processing function of a sink device by a source device.

Also, the present disclosure provides a method for enabling the OBA processing function of a sink device before a source device transmits OBA to the sink device supporting the OBA processing function. To this end, a bit indicating enabling or disabling of the OBA processing function may be defined in a status and control data channel structure (SCDCS) of the sink device. Also, in order to control the defined bit, a bit related to the OBA processing function defined in the SCDCS of the sink device may be set to 1 through a status and control data channel (SCDC0, thereby enabling the OBA processing function.

Also, in the present disclosure, in a case in which the source device, which has transmitted the OBA, wants to transmit a channel-based audio, the source device may set a bit related to the OBA processing function defined in the SCDCS of the sink device to 0 through the SCDC before sending the channel-based audio, thereby disabling the OBA processing function.

The process described above in the embodiments of FIGS. 9 to 13 may be applied to the embodiment of FIG. 21, and here, a redundant description will be omitted.

FIG. 22(a) illustrates an SCDC-write message for enabling the OBA processing function, and FIG. 22(b) illustrates a set register of OBA activation information.

In the present disclosure, OBA enabling information (OBA_Enable) for enabling/disabling the OBA processing function is defined in the SCDCS. In FIG. 22, OBA activation information may be defined by a flag or bit as illustrated in FIG. 22(b). Information (OBA_Enable) included in bit 0 of FIG. 22(b) indicates OBA activation information included in the SCDCS.

Referring to FIG. 22(b), in the present disclosure, a state of the OBA processing function of the sink device may be set using 1 bit of reserved bits of a configuration register.

For example, the OBA activation information is defined in a register of offset 0x30 of the SCDCS, and here, it may be defined by bit 0. When a value of the OBA activation information is set to 1, it may indicate that the OBA processing function is enabled, and when the value of the OBA activation information is set to 0, it may indicate that the OBA processing function is disabled. Thus, the source device may enable/disable the OBA processing function of the sink device by writing the value 1 or 0 in the value of the OBA activation information.

The source device should enable the OBA processing function of the sink device to transmit OBA. The source device may prepare to transmit OBA (S2101). Also, the source device may transmit an SCDC-write message for enabling the OBA processing function (S2103).

FIG. 22(a) illustrates an embodiment of the SCDC-write message enabling the OBA processing function. This message is an SCDC-write message writing OBA activation information (OBA_Enable) into a register away by 0x30 from 0x54 of the sink device in which a slave address is 0x54. That is, the SCDC-write message may include slave address information (Slv Addr=0x54), sub-address information (0x30), and data to be written (Data=OBA_Enable).

The sink device may set a value of OBA activation information according to the received SDCD-write message (S2105). The sink device may set a bit value of a corresponding address according to the received SCDC-write message. That is, in the SCDCS of FIG. 22(b), a position value of Bit 0 may set to 1. Also, the sink device may enable the OBA processing function according to the changed value of the OBA activation information.

The source device may transmit OBA-related meta data together with an operation parameter (S2107). Also, the source device may transmit OBA (S2109).

Meanwhile, when the source device, which has transmitted the OBA, wants to transmit a channel-based audio, the source device may first prepare to transmit the channel-based audio (S2111). Also, the source device may transmit an SCDC-write message disabling the OBA processing function (S2113).

Before transmitting the channel-based audio, the source device may disable the OBA processing function by setting the OBA activation information defined in the SCDCS of the sink device to 0 through an SCDC (S2115).

As described above, the present disclosure may provide users with an opportunity of enjoying ample audio by providing the method for transmitting OBA from a source device to a sink device, the method for transmitting whether OBA processing function is supported between devices and related property information, the method for controlling an OBA processing function of the sink device by the source device and operations thereof.

INDUSTRIAL APPLICABILITY

The preferred embodiments of the present disclosure described above are disclosed for an exemplary purpose, and modifications, changes, substitutions, or additions of various other embodiments may be hereinafter made by those skilled in the art within the technical spirit and the technical scope of the present invention disclosed in the appended claims.

The invention claimed is:

1. A method for processing data by a source device which transmits an object-based audio (OBA) using a high definition media interface (HDMI), the method comprising:
   when a sink device is connected with the source device, requesting the sink device to read enhanced extended display identification data (E-EDID);
   receiving E-EDID including OBA processing information of the sink device from the sink device,
   wherein the OBA processing information includes at least one of capability information indicating capability of processing the OBA and property information required for processing the OBA;
   determining whether the sink device provides support for processing the OBA based on the OBA processing information; and
   when it is determined that the sink device provides support for processing the OBA, enabling or disabling an OBA processing function of the sink device using OBA activation information.

2. The method of claim 1, further comprising:
   when it is determined that the sink device provides support for processing the OBA, transmitting an operation parameter determined based on the E-EDID; and
   transmitting the OBA,
   wherein the operation parameter includes OBA meta data.

3. The method of claim 1, further comprising:
   when it is determined that the sink device does not provide support for processing the OBA, transmitting an operation parameter determined based on the E-EDID; and
   transmitting a channel-based audio,
   wherein the operation parameter includes channel-based audio meta data.

4. The method of claim 1, wherein the OBA activation information is included in a status and control data channel structure (SCDCS) of the sink device.

5. The method of claim 1,
   wherein the OBA processing information is defined in an HDMI audio data block or a Consumer Electronics Association (CEA) audio data block.

6. A source device for transmitting an object-based audio (OBA) using a high definition media interface (HDMI), the source device comprising:
   a HDMI transmitter configured to transmit and receive data through the HDMI; and
   a controller configured to control transmission of the OBA through the HDMI and the HDMI transmitter,
   wherein the source device requests a sink device to read enhanced extended display identification data (E-EDID) when the sink device is connected with the source device, wherein the controller is further configured to:
receive E-EDID including OBA processing information of the sink device from the sink device, and
determine whether the sink device provides support for processing the OBA based on the OBA processing information, and
when it is determined that the sink device provides support for the processing the OBA, enable or disable an OBA processing function of the sink device using OBA activation information, and
wherein the OBA processing information includes at least one of capability information indicating capability of processing the OBA and property information required for processing the OBA.

7. The source device of claim 6,
wherein when it is determined that the sink device provides support for processing the OBA, the source device transmits an operation parameter determined based on the E-EDID and transmits the OBA, and
wherein the operation parameter includes OBA meta data.

8. The source device of claim 6, wherein
when it is determined that the sink device does not provide support for processing the OBA, the source device transmits an operation parameter determined based on the E-EDID and transmits a channel-based audio, and
wherein the operation parameter includes channel-based audio meta data.

9. The source device of claim 6, wherein the OBA activation information is included in a status and control data channel structure (SCDCS) of the sink device.

10. The source device of claim 6,
wherein the OBA processing information is defined in an HDMI audio data block or a Consumer Electronics Association (CEA) audio data block.

11. A method for processing data by a sink device which receives an object-based audio (OBA) using a high definition media interface (HDMI), the method comprising:
receiving a request for reading enhanced extended display identification data (E-EDID) from a connected source device;
transmitting E-EDID including OBA processing information of the sink device to the source device,
wherein the OBA processing information includes at least one of capability information indicating capability of processing the OBA and property information required for processing the OBA; and
receiving operation parameter information from the source device; and
enabling or disabling an OBA processing function of the sink device using OBA activation information.

12. The method of claim 11, further comprising:
when the sink device provides support for processing the OBA, receiving an operation parameter determined based on the E-EDID from the source device; and
receiving the OBA from the source device,
wherein the operation parameter information includes OBA meta data.

13. The method of claim 11, further comprising;
when the sink device does not provide support for processing the OBA, receiving an operation parameter determined based on the E-EDID; and
receiving a channel-based audio,
wherein the operation parameter information includes channel-based audio meta data.

14. The method of claim 11, wherein the OBA activation information is included in a status and control data channel structure (SCDCS) of the sink device.

15. The method of claim 11, wherein
the OBA processing information is defined in an HDMI audio data block or a Consumer Electronics Association (CEA) CEA audio data block.

16. A sink device for receiving an object-based audio (OBA) using a high definition media interface (HDMI), the sink device comprising:
a HDMI receiver configured to transmit and receive data through the HDMI; and
a controller configured to process the OBA received through the HDMI and the HDMI receiver,
wherein the controller is further configured to:
receive a request for reading enhanced extended display identification data (E-EDID) from a connected source device,
transmit E-EDID including OBA processing information of the sink device to the source device,
receive operation parameter information from the source device, and
enable or disable an OBA processing function of the sink device using OBA activation information,
wherein the OBA processing information includes at least one of capability information indicating capability of processing the OBA and property information required for processing the OBA.

17. The sink device of claim 16,
wherein when the sink device provides support for processing the OBA, the sink device receives an operation parameter determined based on the E-EDID from the source device, and receives the OBA from the source device, and
wherein the operation parameter information includes OBA meta data.

18. The sink device of claim 16, wherein
when the sink device does not provides support for processing the OBA, the sink device receives an operation parameter determined based on the E-EDID and receives a channel-based audio, and
wherein the operation parameter information includes channel-based audio meta data.

19. The sink device of claim 16, wherein the OBA activation information is included in a status and control data channel structure (SCDCS) of the sink device.

20. The sink device of claim 16, wherein
the OBA processing information is defined in an HDMI audio data block or a Consumer Electronics Association (CEA) audio data block.

* * * * *